United States Patent
Hu et al.

(10) Patent No.: US 10,003,469 B2
(45) Date of Patent: Jun. 19, 2018

(54) MULTICAST FORWARDING METHOD AND APPARATUS IN TRANSPARENT INTERCONNECTION OF LOTS OF LINK NETWORK, AND ROUTING BRIDGE

(71) Applicant: ZTE Corporation, Shenzhen, Guangdong (CN)

(72) Inventors: Fangwei Hu, Shenzhen (CN); Ting Liao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 294 days.

(21) Appl. No.: 14/895,921

(22) PCT Filed: Nov. 27, 2013

(86) PCT No.: PCT/CN2013/087983
§ 371 (c)(1),
(2) Date: Dec. 21, 2015

(87) PCT Pub. No.: WO2014/086242
PCT Pub. Date: Jun. 12, 2014

(65) Prior Publication Data
US 2016/0261419 A1   Sep. 8, 2016

(30) Foreign Application Priority Data
Dec. 7, 2012  (CN) .......................... 2012 1 0524098

(51) Int. Cl.
*H04L 12/18* (2006.01)
*H04L 12/46* (2006.01)
*H04L 12/761* (2013.01)

(52) U.S. Cl.
CPC ............ *H04L 12/185* (2013.01); *H04L 12/18* (2013.01); *H04L 12/462* (2013.01);
(Continued)

(58) Field of Classification Search
None
See application file for complete search history.

(56) References Cited

U.S. PATENT DOCUMENTS 7,269,182 B1 *   9/2007   Carrel ................. H04L 12/1836
                                                       370/390
2008/0112499 A1 * 5/2008   Bennett ............... H04W 74/006
                                                       375/267
(Continued)

FOREIGN PATENT DOCUMENTS

CN          101335989 A       12/2008
CN          101540652 A        9/2009
(Continued)

OTHER PUBLICATIONS

International Search Report in international application No. PCT/CN2013/087983, dated Mar. 6, 2014.
(Continued)

*Primary Examiner* — Lonnie V Sweet
(74) *Attorney, Agent, or Firm* — Oppedahl Patent Law Firm LLC

(57) ABSTRACT

Provided is a method for multicast forwarding in a TRILL network. The method includes that: when receiving remote multicast data, a routing bridge forwards the multicast data according to capability information of terminals adhered to the routing bridge. An apparatus and a routing bridge for multicast forwarding in a TRILL network are also provided. The technical solutions of the present disclosure take the scenario that a smart terminal and an ordinary terminal together access a TRILL network into consideration, so that address learning is performed between smart terminals through the multicast data, thereby ensuring normal data transmission.

9 Claims, 1 Drawing Sheet

---

A routing bridge obtains capability information of terminals adhered to the routing bridge — 101

↓

The routing bridge forwards multicast data according to the capability information of the terminals adhered to the routing bridge — 102

(52) U.S. Cl.
CPC .......... *H04L 12/4633* (2013.01); *H04L 45/16* (2013.01); *H04L 2012/4629* (2013.01)

(56) References Cited

U.S. PATENT DOCUMENTS

| | | | |
|---|---|---|---|
| 2009/0172170 A1* | 7/2009 | Rey | .................. H04L 29/06027 709/227 |
| 2011/0280572 A1 | 11/2011 | Vobbilisetty | |
| 2011/0286357 A1 | 11/2011 | Haris | |
| 2011/0292947 A1 | 12/2011 | Vobbilisetty | |
| 2011/0299391 A1 | 12/2011 | Vobbilisetty | |
| 2011/0299402 A1 | 12/2011 | Vobbilisetty | |
| 2011/0299413 A1 | 12/2011 | Chatwani | |
| 2011/0299528 A1* | 12/2011 | Yu | ....................... H04L 12/1886 370/390 |
| 2011/0299534 A1 | 12/2011 | Koganti | |
| 2011/0299535 A1 | 12/2011 | Vobbilisetty | |
| 2012/0106339 A1* | 5/2012 | Mishra | .................. H04L 43/106 370/235 |

FOREIGN PATENT DOCUMENTS

| | | |
|---|---|---|
| CN | 101765148 A | 6/2010 |
| CN | 102647324 A | 8/2012 |
| CN | 102801625 A | 11/2012 |
| WO | 2011140028 A1 | 11/2011 |

OTHER PUBLICATIONS

English Translation of the Written Opinion of the International Search Authority in international application No. PCT/CN2013/087983, dated Mar. 6, 2014.

* cited by examiner

MULTICAST FORWARDING METHOD AND APPARATUS IN TRANSPARENT INTERCONNECTION OF LOTS OF LINK NETWORK, AND ROUTING BRIDGE

TECHNICAL FIELD

The present disclosure relates to a multicast forwarding technology, and in particular to a multicast forwarding method and apparatus in a Transparent Interconnection of Lots of Link (TRILL) network, and a routing bridge.

BACKGROUND

The Transparent Interconnection of Lots of Link (TRILL) technology is a technology integrating advantages of the layer 2 technology and the layer 3 technology, which applies the Intermediate System to Intermediate System (ISIS) link state routing protocol to calculate a topology of a layer 2 network, solves the problem that paths of the layer 2 network cannot be fully used because execution of the Rapid Spanning Tree Protocol (STP) in a layer 2 bridge needs to block some links, and provides load balancing of the link through the Equal-Cost Multipath Routing (ECMP) algorithm. The TRILL protocol solves the problem of loop by employing the idea of the shortest path and the minimum hop count of route while avoiding large oscillation of network under the STP network condition after failure appears, and applies the idea of distribution tree to solve the problem of multicast transmission and broadcast transmission while ensuring and simplifying the processing of a multicast message by learning pruning, backward path detection and other ways of the routing protocol. An ingress routing bridge is set at the ingress of the TRILL network, which completes a TRILL encapsulation of original data, wherein unicast data is forwarded along the shortest path calculated by the Shortest Path First (SPF) algorithm, and multicast data or broadcast data are forwarded to multiple egresses along the distribution tree. An egress routing bridge is also set in the TRILL network, which performs de-encapsulation on a TRILL message.

The TRILL protocol introduces a new namespace with length of 16 bits, which is called nickname and encapsulated into the TRILL message header; for a middle transmission routing bridge, it is only needed to look up a nickname table according to a destination nickname to forward data. Since the length of nickname is only 16 bits at the beginning of design, with the expansion of data centre, especially with the proposition of cloud computing data centre, the length of nickname may become a bottleneck in the future. In addition, for an edge routing bridge, it is needed to save a mapping relationship between a Media Access Control (MAC) address and the nickname; when the network size is very large, the amount of the entry mapping relationships is relatively large, so a method for distributing the nickname to terminal users is provided in the industry, in which the terminal users save a part of mapping entries, and a nickname value encapsulated by a terminal is the nickname value used by the routing bridge to which the terminal is adhered, thereby being capable of reducing the size of a mapping table of the edge routing bridge without taking the space of nickname. The terminal which can perform TRILL encapsulation is called smart terminal.

For unicast data, when the edge routing bridge finds that the destination address of data is a smart terminal adhered to the edge routing bridge, the edge routing bridge maintains the TRILL encapsulation of the message without need of de-encapsulation, and directly forwards the message to the destination smart terminal; the destination smart terminal performs de-encapsulation and address learning after receiving the TRILL message.

However, for multicast data, since the terminals adhered to the edge routing bridge may include smart terminals and ordinary terminals (namely the terminals which cannot perform encapsulation and de-encapsulation on the TRILL message), if the edge routing bridge maintains the TRILL encapsulation, then the ordinary terminal cannot parse the multicast data, and the common multicast communication cannot be performed between a remote terminal and the ordinary terminal. If the edge routing bridge performs de-encapsulation on the TRILL message, and forwards the original message to the terminal adhered to the routing bridge, then the smart terminal cannot learn mapping information of an opposite-side terminal, thereby disabling the normal communication between the smart terminals.

SUMMARY

In view of this, the present disclosure is intended to provide a method, apparatus and a routing bridge for multicast forwarding in a TRILL network, which can correspondingly forward multicast data according to capability information of terminals as well as support normal access of a smart terminal and an ordinary terminal.

To this end, the technical solutions of the present disclosure are implemented as follows.

A method for multicast forwarding in a TRILL network is provided, which includes that:

when a routing bridge receives remote multicast data, the routing bridge forwards the multicast data according to capability information of terminals adhered to the routing bridge.

Preferably, the capability information of the terminals may include capability information about whether the terminals support performing TRILL encapsulation on transmitted data and performing de-encapsulation on a received TRILL message.

Preferably, forwarding the multicast data according to the capability information of the terminals adhered to the routing bridge may include that:

when the routing bridge determines that all the terminals adhered to the routing bridge do not support TRILL encapsulation or TRILL message de-encapsulation, it performs TRILL de-encapsulation on the multicast data, and then forwards the multicast data to all the terminals;

when the routing bridge determines that all the terminals adhered to the routing bridge support TRILL encapsulation and TRILL message de-encapsulation, the routing bridge directly forwards the multicast data to all the terminals;

when the routing bridge determines that some of the terminals adhered to the routing bridge do not support TRILL encapsulation or TRILL message de-encapsulation, and some of the terminals adhered to the routing bridge support TRILL encapsulation and TRILL message de-encapsulation, the routing bridge takes a copy of the multicast data, performs TRILL de-encapsulation on one copy of the multicast data, and forwards both the two copies of the multicast data to all the terminals.

Preferably, when both the two copies of the multicast data are forwarded to all the terminals of this port, the method may further include that:

the terminals which support TRILL encapsulation and TRILL message de-encapsulation receive the multicast data on which the TRILL de-encapsulation is not performed, and discard the multicast data on which the TRILL de-encapsulation is performed;

the terminals which do not support TRILL encapsulation or TRILL message de-encapsulation receive the multicast data on which the TRILL de-encapsulation is performed, and discard the multicast data on which the TRILL de-encapsulation is not performed.

An apparatus for multicast forwarding in a TRILL network is also provided, which includes a receiving unit and a forwarding unit, wherein, the receiving unit is configured to receive remote multicast data; and the forwarding unit is configured to forward the multicast data according to capability information of the terminals adhered to the apparatus.

Preferably, the receiving unit may be further configured to receive the capability information of the terminals which is reported by the terminals to the apparatus when the terminals are adhered to the apparatus.

Preferably, the apparatus may further include:

a sending unit, which is configured to periodically send capability information query messages to the terminals adhered to the apparatus;

correspondingly, the receiving unit is further configured to receive the capability information which is reported by the terminals adhered to the apparatus.

Preferably, the capability information of the terminals may include capability information about whether the terminals support performing TRILL encapsulation on transmitted data and performing de-encapsulation on a received TRILL message.

Preferably, the forwarding unit may further include a determining subunit, a copying subunit, a de-encapsulation subunit and a forwarding subunit, wherein, the determining subunit is configured to, when determining that all the terminals adhered to the apparatus do not support TRILL encapsulation or TRILL message de-encapsulation, trigger the de-encapsulation subunit to perform TRILL de-encapsulation on the multicast data; correspondingly, the forwarding subunit is configured to forward the multicast data subjected to the de-encapsulation to all the terminals;

or, the determining subunit is configured to, when determining that all the terminals adhered to the apparatus support TRILL encapsulation and TRILL message de-encapsulation, trigger the forwarding subunit to directly forward the multicast data to all the terminals of this port;

or, the determining subunit is configured to, when determining that some of the terminals adhered to the apparatus do not support TRILL encapsulation or TRILL message de-encapsulation, and some of the terminals adhered to the apparatus support TRILL encapsulation and TRILL message de-encapsulation, trigger the copying subunit to take a copy of the multicast data; correspondingly, the de-encapsulation subunit is configured to perform TRILL de-encapsulation on one copy of the multicast data, and the forwarding subunit is configured to forward both the two copies of the multicast data to all the terminals.

A routing bridge is also provided, which includes the apparatus for multicast forwarding in a TRILL network.

In the present disclosure, when receiving remote multicast data, a routing bridge forwards the multicast data according to capability information of terminals adhered to the routing bridge. Specifically, when the routing bridge determines that all the terminals adhered to the routing bridge do not support TRILL encapsulation or TRILL message de-encapsulation, it performs TRILL de-encapsulation on the multicast data, and then forwards the multicast data to all the terminals; when the routing bridge determines that all the terminals adhered to the routing bridge support TRILL encapsulation and TRILL message de-encapsulation, it directly forwards the multicast data to all the terminals; when the routing bridge determines that some of the terminals adhered to the routing bridge do not support TRILL encapsulation or TRILL message de-encapsulation, and some of the terminals adhered to the routing bridge support TRILL encapsulation and TRILL message de-encapsulation, it takes a copy of the multicast data, performs TRILL de-encapsulation on one copy of the multicast data, and forwards both the two copies of the multicast data to all the terminals; the terminals which support TRILL encapsulation and TRILL message de-encapsulation receive the multicast data on which the TRILL de-encapsulation is not performed, and discard the multicast data on which the TRILL de-encapsulation is performed; the terminals which do not support TRILL encapsulation or TRILL message de-encapsulation receive the multicast data on which the TRILL de-encapsulation is performed, and discard the multicast data on which the TRILL de-encapsulation is not performed. The technical solutions of the present disclosure take the scenario that a smart terminal and an ordinary terminal together access a TRILL network into consideration, so that address learning is performed between smart terminals through the multicast data, thereby ensuring normal data transmission.

DETAILED DESCRIPTION

For making the aim, the technical solutions and the advantages of the present disclosure more clear, the present disclosure is elaborated below with reference to the embodiments and the accompanying drawings.

Figure 1:
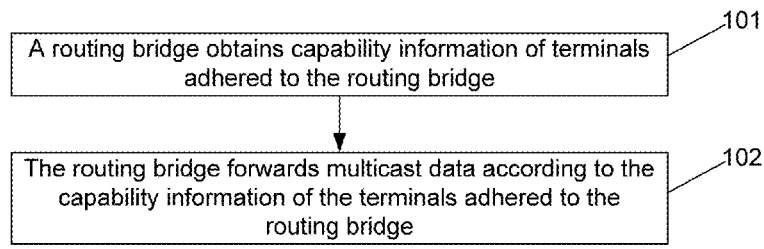
FIG. 1 is a flowchart of a method for multicast forwarding in a TRILL network according to an embodiment of the present disclosure.

FIG. 1 is a flowchart of a method for multicast forwarding in a TRILL network according to an embodiment of the present disclosure; as shown in FIG. 1, the method for multicast forwarding in a TRILL network of the present disclosure includes the following steps.

Step 101 is that a routing bridge obtains capability information of terminals adhered to the routing bridge.

In the present disclosure, the routing bridge may obtain the capability information of the terminals by initiatively sending a query message or by receiving an initiative report from the terminals. Specifically, when a terminal is adhered to the routing bridge, it reports its own capability information to the routing bridge; or, the routing bridge periodically sends a capability information query message to the terminal adhered to the routing bridge, and the terminal adhered to the routing bridge reports its own capability information.

The capability information of the terminal includes the capability information about whether the terminal supports performing TRILL encapsulation on transmitted data and performing de-encapsulation on a received TRILL message. In the present disclosure, the terminal which supports performing TRILL encapsulation on transmitted data and performing de-encapsulation on a received TRILL message is a smart terminal, and the terminal which does not support performing TRILL encapsulation on transmitted data or performing de-encapsulation on a received TRILL message is an ordinary terminal.

Step 102 is that the routing bridge forwards the multicast data according to the capability information of the terminals adhered to the routing bridge.

Specifically, when the routing bridge determines that all the terminals adhered to the routing bridge do not support TRILL encapsulation or TRILL message de-encapsulation, it performs the TRILL de-encapsulation on the multicast data, and then forwards the multicast data to all the terminals; when the routing bridge determines that all the terminals adhered to the routing bridge support TRILL encapsulation and TRILL message de-encapsulation, it directly forwards the multicast data to all the terminals; when the routing bridge determines that some of the terminals adhered to the routing bridge do not support TRILL encapsulation and TRILL message de-encapsulation, and some of the terminals adhered to the routing bridge support TRILL encapsulation and TRILL message de-encapsulation, it takes a copy of the multicast data, performs the TRILL de-encapsulation on one copy of multicast data, and forwards both the two copies of multicast data to all the terminals; the terminal which supports TRILL encapsulation and TRILL message de-encapsulation receives the multicast data on which the TRILL de-encapsulation is not performed, and discards the multicast data on which the TRILL de-encapsulation is performed; the terminal which does not support TRILL encapsulation and TRILL message de-encapsulation receives the multicast data on which the TRILL de-encapsulation is performed, and discards the multicast data on which the TRILL de-encapsulation is not performed.

In the present disclosure, all the terminals adhered to the routing bridge are those adhered to different ports of the routing bridge; specifically, when multicast data is forwarded, the multicast data is forwarded mainly based on each port which is taken as a unit. That is to say, when the routing bridge determines that all the terminals which access a certain port of the routing bridge are ordinary terminals, the routing bridge performs TRILL de-encapsulation on the multicast data, and then forwards the multicast data to all the terminals of this port; when the routing bridge determines that all the terminals which access a certain port of the routing bridge are ordinary terminals, the routing bridge directly forwards the multicast data to all the terminals of this port, then each smart terminal performs TRILL de-encapsulation on the multicast data and performs address learning, so as to generate routing information to a sending side; when the routing bridge determines that there are both the ordinary terminals and the smart terminals in all the terminals accessing a certain port of the routing bridge, the routing bridge takes a copy of the multicast data, performs the TRILL de-encapsulation on one copy of the multicast data, and forwards both the two copies of the multicast data to all the terminals of this port; wherein, the smart terminal receives the multicast data on which the TRILL de-encapsulation is not performed, and discards the multicast data on which the TRILL de-encapsulation is performed; the ordinary terminal receives the multicast data on which the TRILL de-encapsulation is performed, and discards the multicast data on which the TRILL de-encapsulation is not performed.

When receiving the multicast data, the routing bridge forwards the multicast data according to the capability information of the terminals adhered to the routing bridge.

Figure 2:
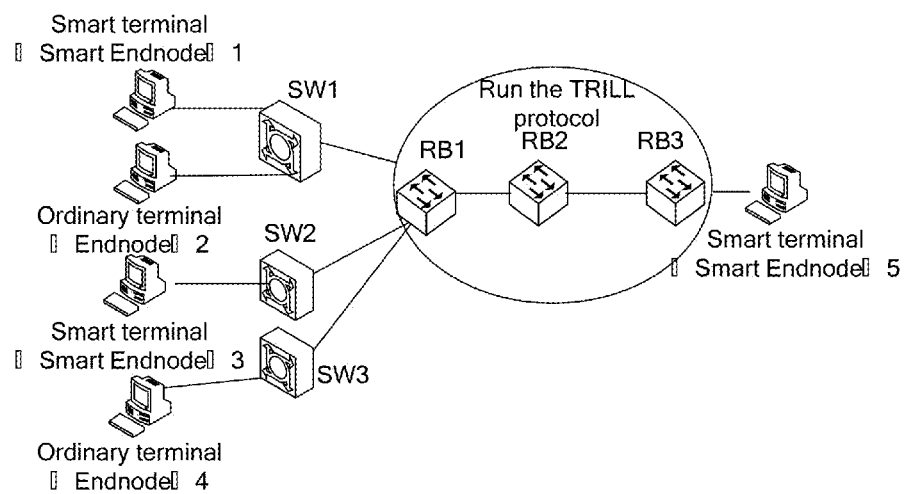
FIG. 2 is a diagram of an application scenario of the method for multicast forwarding in a TRILL network according to an embodiment of the present disclosure.

FIG. 2 is a diagram of an application scenario of the method for multicast forwarding in a TRILL network according to an embodiment of the present disclosure. As shown in FIG. 2, Smart endnode1 and Smart endnode3 are smart terminals which can perform encapsulation and de-encapsulation on a TRILL message; endnode2 and endnode4 are ordinary terminals which can only send and receive an ordinary Ethernet message, and cannot perform encapsulation and de-encapsulation on a TRILL message. All of the four terminals join the same multicast group. The remote Smart endnode5 is also a smart terminal, which is a source address of the corresponding multicast group. The Smart endnode5 communicates with the Smart endnode1, the endnode2 and the Smart endnode3 through the TRILL network; the Smart endnode1 and the endnode2 access the TRILL network through an Ethernet Switch SW1, the Smart endnode3 accesses the TRILL network through an SW2, and the endnode4 accesses the TRILL network through an SW3; the TRILL network includes the routing bridges RB1, RB2 and RB3 which are connected in turn. A multicast message sent by the Smart endnode5 is sent to the RB1 along a multicast distribution tree after passing by the RB3; after receiving the multicast message, the RB1 copies and forwards the corresponding multicast message according to the presence situation of a receiver; since the port connected with the SW1 finds that there are both the ordinary terminals and the smart terminals in the learned terminals, two copies of the multicast message are made at the port, the TRILL encapsulation is performed on one copy, and the TRILL de-encapsulation is performed on the other to generate an ordinary message, and both of them are sent via the port. If the port connected with the SW2 finds that there are only smart terminals in the learned terminals, then the port only needs to directly forward the received multicast message. If the port connected with the SW3 finds that there are only ordinary terminals in the learned terminals, then the port only needs to send an ordinary message after the TRILL de-encapsulation. After the Smart endnode1 and the Smart endnode3 receive the multicast message subjected to the TRILL encapsulation, they perform de-encapsulation on the multicast message to obtain an MAC address and a Nickname address of the Smart endnode5, and save them in a local mapping table to complete address learning; another message is an ordinary multicast Ethernet message subjected to de-encapsulation performed by the RB1, and the ordinary terminals endnode2 and endnode4 can identify and parse the ordinary multicast message.

Figure 3:
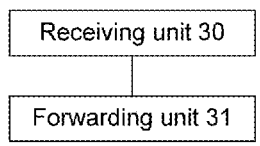
FIG. 3 is a structural diagram of an apparatus for multicast forwarding in a TRILL network according to an embodiment of the present disclosure.

FIG. 3 is a structural diagram of an apparatus for multicast forwarding in a TRILL network according to an embodiment of the present disclosure; as shown in FIG. 3, the multicast forwarding apparatus in the TRILL network of this embodiment includes a receiving unit 30 and a forwarding unit 31, wherein, the receiving unit 30 is configured to receive multicast data;

the forwarding unit 31 is configured to forward the multicast data according to capability information of the terminals adhered to the apparatus.

The receiving unit 30 is further configured to receive the capability information of the terminals which is reported to the apparatus by the terminals when the terminals are adhered to the apparatus.

On the basis of the multicast forwarding apparatus in a TRILL network shown in FIG. 3, the multicast forwarding apparatus in the TRILL network of this embodiment further includes:

a sending unit (not shown in FIG. 3), which is configured to periodically send capability information query messages to the terminals adhered to the apparatus;

correspondingly, the receiving unit 30 is further configured to receive the capability information which is reported by the terminals adhered to the apparatus.

The skilled personnel in the field should understand that the above sending unit is not the necessary technical means for satisfying the basic intention of the present disclosure, but is set only for optimizing the technical solutions of the present disclosure.

In the present disclosure, the sending unit and the receiving unit 30 may be implemented through antenna devices.

The capability information of the terminals includes the capability information about whether the terminals support performing TRILL encapsulation on transmitted data and performing de-encapsulation on a received TRILL message.

The forwarding unit of the present disclosure further includes a determining subunit (not shown in FIG. 3), a copying subunit (not shown in FIG. 3), a de-encapsulation subunit (not shown in FIG. 3) and a forwarding subunit (not shown in FIG. 3), wherein, the determining subunit is configured to, when determining that all the terminals adhered to the apparatus do not support TRILL encapsulation or TRILL message de-encapsulation, trigger the de-encapsulation subunit to perform TRILL de-encapsulation on the multicast data; correspondingly, the forwarding subunit is configured to forward the multicast data subjected to de-encapsulation to all the terminals;

or, the determining subunit is configured to, when determining that all the terminals adhered to the apparatus support TRILL encapsulation and TRILL message de-encapsulation, trigger the forwarding subunit to directly forward the multicast data to all the terminals of this port;

or, the determining subunit is configured to, when determining that some of the terminals adhered to the apparatus do not support TRILL encapsulation or TRILL message de-encapsulation, and some of the terminals adhered to the apparatus support TRILL encapsulation and TRILL message de-encapsulation, trigger the copying subunit to take a copy of the multicast data; correspondingly, the de-encapsulation subunit is configured to perform the TRILL de-encapsulation on one copy of the multicast data, and the forwarding subunit is configured to forward both the two copies of the multicast data to all the terminals. Correspondingly, the terminal which supports TRILL encapsulation and TRILL message de-encapsulation receives the multicast data on which the TRILL de-encapsulation is not performed, and discards the multicast data on which the TRILL de-encapsulation is performed; the terminal which does not support TRILL encapsulation or TRILL message de-encapsulation receives the multicast data on which the TRILL de-encapsulation is performed, and discards the multicast data on which the TRILL de-encapsulation is not performed.

Those skilled in the art should understand that functions of the processing units involved in the multicast forwarding apparatus in a TRILL network shown in FIG. 3 can be implemented by hardware circuits or corresponding software executed by a processor. The functions of the processing units can be understood in combination with descriptions about the related embodiments and examples of the method for multicast forwarding in a TRILL network.

The present disclosure also describes a routing bridge, wherein the routing bridge includes the multicast forwarding apparatus in a TRILL network.

Obviously, the skilled personnel in the field should appreciate that the above processing units or steps of the present disclosure may be implemented by a general-purpose computing device, and they may be centralized in a single computing device or distributed on a network composed of multiple computing devices; optionally, they may be implemented by program codes which are capable of being executed by a computing device, so that they can be stored in a storage device and executed by the computing device; or they are respectively made into integrated circuit modules, or multiple modules or steps of them are made into a single integrated circuit module to implement. In this way, the present disclosure is not limited to any particular combination of hardware and software.

The above is only the preferred embodiment of the present disclosure and not intended to limit the scope of the claims of the present disclosure.

INDUSTRIAL APPLICABILITY

When a routing bridge in the present disclosure determines that all the terminals adhered to the routing bridge do not support TRILL encapsulation or TRILL message de-encapsulation, the routing bridge performs TRILL de-encapsulation on the multicast data, and then forwards the multicast data to all the terminals; when the routing bridge determines that all the terminals adhered to the routing bridge support TRILL encapsulation and TRILL message de-encapsulation, it directly forwards the multicast data to all the terminals; when the routing bridge determines that some of the terminals adhered to the routing bridge do not support TRILL encapsulation or TRILL message de-encapsulation, and some of the terminals adhered to the routing bridge support TRILL encapsulation and TRILL message de-encapsulation, it takes a copy of the multicast data, performs the TRILL de-encapsulation on one copy of the multicast data, and forwards both the two copies of the multicast data to all the terminals; the terminal which supports TRILL encapsulation and TRILL message de-encapsulation receives the multicast data on which the TRILL de-encapsulation is not performed, and discards the multicast data on which the TRILL de-encapsulation is performed; the terminal which does not support TRILL encapsulation and TRILL message de-encapsulation receives the multicast data on which the TRILL de-encapsulation is performed, and discards the multicast data on which the TRILL de-encapsulation is not performed. The technical solutions of the present disclosure take the scenario that the smart terminal and the ordinary terminal together access the TRILL network into consideration, so that address learning is performed between the smart terminals through the multicast data, thereby ensuring normal data transmission.

What is claimed is:

1. A method for multicast forwarding in a Transparent Interconnection of Lots of Link (TRILL) network, comprising:

obtaining, by a routing bridge, capability information of terminals adhered to the routing bridge; wherein the capability information of the terminals comprises capability information about whether the terminals support performing TRILL encapsulation on transmitted data and performing de-encapsulation on a received TRILL message;

when receiving remote multicast data, forwarding, by the routing bridge, the multicast data according to the capability information of the terminals adhered to the routing bridge;

wherein forwarding the multicast data according to the capability information of the terminals adhered to the routing bridge comprises:

when the routing bridge determines that all the terminals adhered to the routing bridge do not support TRILL encapsulation or TRILL message de-encapsulation, performing, by the routing bridge, TRILL de-encapsulation on the multicast data, and then forwarding the multicast data to all the terminals;

when the routing bridge determines that all the terminals adhered to the routing bridge support TRILL encapsulation and TRILL message de-encapsulation, directly forwarding, by the routing bridge, the multicast data to all the terminals;

when the routing bridge determines that some of the terminals adhered to the routing bridge do not support TRILL encapsulation or TRILL message de-encapsulation, and some of the terminals adhered to the routing bridge support TRILL encapsulation and TRILL message de-encapsulation, taking, by the routing bridge, a copy of the multicast data, performing TRILL de-encapsulation on one of the copy of the multicast data and the multicast data, and forwarding both the multicast data on which the TRILL de-encapsulation is performed and other of the copy of the multicast data and the multicast data to all the terminals.

2. The method according to claim 1, when both the multicast data on which the TRILL de-encapsulation is performed and other of the copy of the multicast data and the multicast data are forwarded to all the terminals of this port, the method further comprising:

receiving, by the terminals which support TRILL encapsulation and TRILL message de-encapsulation, the multicast data on which the TRILL de-encapsulation is not performed, and discarding the multicast data on which the TRILL de-encapsulation is performed;

receiving, by the terminals which do not support TRILL encapsulation or TRILL message de-encapsulation, the multicast data on which the TRILL de-encapsulation is performed, and discarding the multicast data on which the TRILL de-encapsulation is not performed.

3. An apparatus for multicast forwarding in a Transparent Interconnection of Lots of Link (TRILL) network, the apparatus comprising a processor; and a memory for storing instructions executable by the processor;

wherein the processor is configured to:

receive remote multicast data and capability information of terminals adhered to the routing bridge; and forward the multicast data according to the capability information of the terminals adhered to the apparatus;

wherein the capability information of the terminals comprises capability information about whether the terminals support performing TRILL encapsulation on transmitted data and performing de-encapsulation on a received TRILL message;

wherein the processor is further configured to:

when determining that all the terminals adhered to the apparatus do not support TRILL encapsulation or TRILL message de-encapsulation, perform TRILL de-encapsulation on the multicast data; and forward the multicast data subjected to the de-encapsulation to all the terminals;

or, when determining that all the terminals adhered to the apparatus support TRILL encapsulation and TRILL message de-encapsulation, directly forward the multicast data to all the terminals of this port;

or, when determining that some of the terminals adhered to the apparatus do not support TRILL encapsulation or TRILL message de-encapsulation, and some of the terminals adhered to the apparatus support TRILL encapsulation and TRILL message de-encapsulation, take a copy of the multicast data; perform TRILL de-encapsulation on one of the copy of the multicast data and the multicast data, and forward both the multicast data on which the TRILL de-encapsulation is performed and other of the copy of the multicast data and the multicast data to all the terminals.

4. The apparatus according to claim 3, wherein the processor is further configured to receive the capability information of the terminals which is reported by the terminals to the apparatus when the terminals are adhered to the apparatus.

5. The apparatus according to claim 3, wherein the processor is further configured to:

periodically send capability information query messages to the terminals adhered to the apparatus; and receive the capability information which is reported by the terminals adhered to the apparatus.

6. A routing bridge, comprising an apparatus for multicast forwarding in a Transparent Interconnection of Lots of Link (TRILL) network, the apparatus comprising a processor; and a memory for storing instructions executable by the processor;

wherein the processor is configured to:

receive remote multicast data and capability information of terminals adhered to the routing bridge; and forward the multicast data according to the capability information of the terminals adhered to the apparatus;

wherein the capability information of the terminals comprises capability information about whether the terminals support performing TRILL encapsulation on transmitted data and performing de-encapsulation on a received TRILL message;

wherein the processor is further configured to:

when determining that all the terminals adhered to the apparatus do not support TRILL encapsulation or TRILL message de-encapsulation, perform TRILL de-encapsulation on the multicast data; and forward the multicast data subjected to the de-encapsulation to all the terminals;

or, when determining that all the terminals adhered to the apparatus support TRILL encapsulation and TRILL message de-encapsulation, directly forward the multicast data to all the terminals of this port;

or, when determining that some of the terminals adhered to the apparatus do not support TRILL encapsulation or TRILL message de-encapsulation, and some of the terminals adhered to the apparatus support TRILL encapsulation and TRILL message de-encapsulation, take a copy of the multicast data; perform TRILL de-encapsulation on one of the copy of the multicast data and the multicast data, and forward both the multicast data on which the TRILL de-encapsulation is performed and other of the copy of the multicast data and the multicast data to all the terminals.

7. The routing bridge according to claim 6, wherein the processor is further configured to receive the capability information of the terminals which is reported by the terminals to the apparatus when the terminals are adhered to the apparatus.

8. The routing bridge according to claim 6, wherein the processor is further configured to:
  periodically send capability information query messages to the terminals adhered to the apparatus; and
  receive the capability information which is reported by the terminals adhered to the apparatus.

9. The method according to claim 1, wherein the step of obtaining the capability information of the terminals adhered to the routing bridge by the routing bridge comprises:
  periodically sending, by the routing bridge, capability information query messages to the terminals adhered to the apparatus, and receiving, by the routing bridge, the capability information reported by the terminals adhered to the apparatus; or
  receiving, by the routing bridge, the capability information of the terminals which is reported initiatively by the terminals when the terminals are adhered to the apparatus.

\* \* \* \* \*